United States Patent
Wan (10) Patent No.: US 12,040,649 B2
(45) Date of Patent: Jul. 16, 2024

(54) CHARGING DEVICE, DEVICE TO BE CHARGED, CHARGING METHOD, AND COMPUTER STORAGE MEDIUM

(71) Applicant: GUANGDONG OPPO MOBILE TELECOMMUNICATIONS CORP., LTD., Dongguan (CN)

(72) Inventor: Shiming Wan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 596 days.

(21) Appl. No.: 17/346,189

(22) Filed: Jun. 11, 2021

(65) Prior Publication Data

US 2021/0305831 A1 Sep. 30, 2021

Related U.S. Application Data

(63) Continuation of application No. PCT/CN2018/122742, filed on Dec. 21, 2018.

(51) Int. Cl.
H02J 7/00 (2006.01)
H02J 50/10 (2016.01)

(52) U.S. Cl.
CPC ........ *H02J 7/0068* (2013.01); *H02J 7/00714* (2020.01); *H02J 7/007182* (2020.01); *H02J 50/10* (2016.02)

(58) Field of Classification Search
CPC .............. H02J 7/0068; H02J 7/00714; H02J 7/007182; H02J 50/10; H02J 2207/30;

(Continued)

(56) References Cited

U.S. PATENT DOCUMENTS 7,948,208 B2 * 5/2011 Partovi ................. H02J 7/0013
320/108
8,957,632 B2 2/2015 Gu
(Continued)

FOREIGN PATENT DOCUMENTS

CA 3053269 A1 10/2018
CN 101707384 A 5/2010
(Continued)

OTHER PUBLICATIONS

Espace translation of disclosure of CN106451702A, Vehicle Chager, Fusheng, Bejing Kuneng Technology Co. Ltd., 2017, pp. 1-8 (Year: 2017).*

(Continued)

*Primary Examiner* — Stacy Whitmore
(74) *Attorney, Agent, or Firm* — BAYES PLLC (57) ABSTRACT

A charging device includes a control unit used for controlling, when determined as being in a wireless charging mode, a path to be connected between a charging management unit and a wireless charging receiver unit, and controlling, when determined as being in a wired charging mode, a path to be connected between the charging management unit and a wired charging connector unit. The charging management unit is used for having, on the basis of the path being connected by the control unit, the wireless charging receiver unit or the wired charging connector unit to charge a battery. The control unit is also used for transmitting, when determined as the wireless charging mode, a control instruction to a wireless charging device for indicating that transmission power of the wireless charging device needs to be adjusted.

18 Claims, 3 Drawing Sheets

(58) Field of Classification Search
CPC ........ H02J 2207/40; H02J 50/80; H02J 50/12; H04B 5/79
See application file for complete search history.

(56) References Cited

U.S. PATENT DOCUMENTS

| | | | |
|---|---|---|---|
| 11,539,219 B2* | 12/2022 | Wan | ........................ H02J 50/80 |
| 2005/0194926 A1 | 9/2005 | Di Stefano | |
| 2016/0300547 A1 | 10/2016 | El-Rukby et al. | |
| 2017/0054328 A1 | 2/2017 | Jung et al. | |
| 2024/0056123 A1* | 2/2024 | Park | ........................ H04B 5/72 |

FOREIGN PATENT DOCUMENTS

| | | | |
|---|---|---|---|
| CN | 103036282 A | 4/2013 |
| CN | 106451702 A | 2/2017 |
| CN | 106532867 A | 3/2017 |
| CN | 106712178 A | 5/2017 |
| CN | 106786897 A | 5/2017 |
| CN | 107248769 A | 10/2017 |
| CN | 108199438 A | 6/2018 |
| CN | 108233455 A | 6/2018 |
| CN | 207518328 U | 6/2018 |
| WO | 2018184230 A1 | 10/2018 |

OTHER PUBLICATIONS

Espace translation of disclosure of CN108199438A Wireless charging method and receiving end equipment, 2018, Wan et al., pp. 1-6. (Year: 2018).*

International Search Report and the Written Opinion Dated Sep. 19, 2019 From the International Searching Authority Re. Application No. PCT/CN2018/122742.

The Second Office Action dated Jul. 17, 2023 from Chinese patent application No. 201880099202.2.

The Final Office Action dated Sep. 28, 2023 from Chinese patent application No. 201880099202.2.

Supplementary Search Report Dated Nov. 16, 2021 From the Extended European search report(EESR) of the Application No. 18944109.0, 9 pages.

First Office Action with search report Dated Feb. 28, 2023 from the Chinese patent Application No. 201880099202.2.

* cited by examiner

CHARGING DEVICE, DEVICE TO BE CHARGED, CHARGING METHOD, AND COMPUTER STORAGE MEDIUM

CROSS REFERENCE TO RELATED APPLICATION

This application is a continuation of International Application No. PCT/CN2018/122742, filed on Dec. 21, 2018, the entire contents of which are incorporated herein by reference.

BACKGROUND

Embodiments of the present disclosure relate to a field of terminals, and more particularly to a charging device, a to-be-charged device, a charging method and a computer storage medium.

With rapid development of mobile terminal industries, people are no longer limited to making phone calls using mobile terminals. The mobile terminals are also used to listen to music, watch videos, browser web pages and play games. High power consumption is everywhere although these newly added functions bring people a joy experience, and this causes battery capacity of the mobile terminals to be larger and larger. At present, wired charging or wireless charging can be adopted to charge the terminals. The wired charging needs to add a control chip at the terminal side to communicate with an adapter in real time for controlling the charging process. As to the wireless charging, it also needs a corresponding control chip to carry out management and control because its control process is complicated. As a result, hardware circuit at the terminal side is more complex such that utilization of printed circuit board (PCB) is low.

SUMMARY

In view of above content, embodiments of the present disclosure are expected to provide a charging device, a to-be-charged device, a charging method and a computer storage medium, which can not only realize compatibility of wired charging and wireless charging, but also simplify the design of hardware circuit, improve utilization of PCB and save the cost.

The technical solutions of embodiments of the present disclosure may be implemented as follows.

In a first aspect, the embodiments of the present disclosure provide a charging device, including a wireless charging receiver unit, a wired charging connector unit, a control unit and a charging management unit; the control unit, configured to control, responsive to determined as being in a wireless charging mode, a path to be connected between the charging management unit and the wireless charging receiver unit, and further configured to control, responsive to determined as being in a wired charging mode, a path to be connected between the charging management unit and the wired charging connector unit; the charging management unit, configured to have, on the basis of the path being connected by the control unit, the wireless charging receiver unit or the wired charging connector unit to charge a battery; the control unit, further configured to transmit, responsive to determined as being in the wireless charging mode, a control instruction to a wireless charging device on the basis of a battery voltage, a battery current and an output current of the wireless charging receiver unit that are obtained by detection, wherein the control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current.

In above solution, the charging device further includes a wired fast charging unit connecting to the wired charging connector unit and the control unit; the control unit, further configured to control, responsive to determined as being in a wired fast charging mode, the wired fast charging unit to be in a direct connection state; and the wired fast charging unit, configured to directly load corresponding output voltage and output current of the wired charging connector unit to the battery to charge the battery.

In above solution, the wired fast charging unit is provided with a switch subunit including at least one of a metal-oxide-semiconductor field-effect transistor (MOSFET) switch, a triode switch and a thyristor switch.

In above solution, the wired fast charging unit is integrated into the charging management unit.

In above solution, the charging management unit includes a load switch and a first voltage conversion subunit; the load switch, configured to receive the control instruction of the control module and perform, on the basis of the control instruction, an operation of switching to the wireless charging receiver unit or the wired charging connector unit; and the first voltage conversion subunit, configured to perform, on the basis of the switching operation performed by the load switch, a voltage conversion on the corresponding output voltage and output current of the wired charging connector unit or the wireless charging receiver unit.

In above solution, the control unit is configured to control, responsive to determined as being in a wireless ordinary charging mode, the load switch to switch to the wireless charging receiver unit; and the first voltage conversion subunit, configured to perform a voltage conversion on a first direct-current (DC) voltage and a first DC current outputted by the wireless charging receiver unit and load a first charging voltage and a first charging current obtained after the conversion, to the battery to charge the battery.

In above solution, the charging device further includes a detection unit including at least one of a current sensing resistor, a current transformer, a Hall sensor and a transistor; the detection unit, configured to detect the battery voltage and the battery current of the battery, and further configured to detect the output current of the charging receiver unit.

In above solution, the control unit is configured to control, responsive to determined as being in a wireless fast charging mode, the load switch to switch to the wireless charging receiver unit, and transmit the control instruction to the wireless charging device on the basis of the battery voltage, the battery current and the output current of the wireless charging receiver unit that are obtained by detection; the wireless charging receiver unit, further configured to receive a wireless charging signal adjusted by the wireless charging device, and output an adjusted first DC voltage and an adjusted first DC current on the basis of the adjusted wireless charging signal; and the first voltage conversion subunit, configured to perform a voltage conversion on the adjusted first DC voltage and the adjusted first DC current and load a second charging voltage and a second charging current obtained after the conversion, to the battery to charge the battery.

In above solution, the control unit is configured to control, responsive to determined as being in a wired ordinary charging mode, the load switch to switch to the wired charging connector unit; and the first voltage conversion subunit, configured to perform a voltage conversion on a second direct-current (DC) voltage and a second DC current outputted by the wired charging connector unit and load a third charging voltage and a third charging current obtained after the conversion, to the battery to charge the battery.

In above solution, the control unit is further configured to control, responsive to determined as being concurrently in the wireless charging mode and the wired charging mode, the wired charging connector unit to be in an activated state and the wireless charging receiver unit to be in a deactivated state.

In above solution, the battery includes a single-cell structure and a N-cells connected-in-series structure, where N is a positive integer greater than 1.

In a second aspect, the embodiments of the present disclosure provide a to-be-charged device, which includes the charging device according to any of the solutions in the first aspect.

In a third aspect, the embodiments of the present disclosure provide a charging system, including a wired charging device, a wireless charging device and the to-be-charged device according to the second aspect, wherein the wireless charging device includes a wireless charging transmission unit.

In a fourth aspect, the embodiments of the present disclosure provide a charging method, applied to the to-be-charged device according to the second aspect, the method including responsive to determined as being in a wireless charging mode, controlling a path to be connected between a charging management unit and a wireless charging receiver unit, and having the wireless charging receiver unit to charge a battery of the to-be-charged device; and responsive to determined as being in a wired charging mode, controlling a path to be connected between the charging management unit and a wired charging connector unit, and having the wired charging connector unit to charge the battery of the to-be-charged device; wherein responsive to determined as being in the wireless charging mode, the method further includes transmitting a control instruction to a wireless charging device on the basis of a battery voltage, a battery current and an output current of the wireless charging receiver unit that are obtained by detection, wherein the control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current.

In above solution, responsive to determined as being in the wired charging mode, the method further includes responsive to determined as being in a wired fast charging mode, controlling a wired fast charging unit to be in a direct connection state; and directly loading corresponding output voltage and output current of the wired charging connector unit to the battery to charge the battery.

In above solution, the wired fast charging unit is provided with a switch subunit including at least one of a metal-oxide-semiconductor field-effect transistor (MOSFET) switch, a triode switch and a thyristor switch.

In above solution, the wired fast charging unit is integrated into the charging management unit.

In above solution, the charging management unit includes a load switch and a first voltage conversion subunit; the load switch, configured to receive the control instruction of the control module and perform, on the basis of the control instruction, an operation of switching to the wireless charging receiver unit or the wired charging connector unit; and the first voltage conversion subunit, configured to perform, on the basis of the switching operation performed by the load switch, a voltage conversion on the corresponding output voltage and output current of the wired charging connector unit or the wireless charging receiver unit.

In above solution, the controlling, responsive to determined as being in the wireless charging mode, the path to be connected between the charging management unit and the wireless charging receiver unit, and having the wireless charging receiver unit to charge the battery of the to-be-charged device includes responsive to determined as being in a wireless ordinary charging mode, controlling the load switch to switch to the wireless charging receiver unit; performing, by the first voltage conversion subunit, a voltage conversion on a first direct-current (DC) voltage and a first DC current outputted by the wireless charging receiver unit to obtain a first charging voltage and a first charging current; and loading the first charging voltage and the first charging current to the battery to charge the battery.

In above solution, before the controlling, responsive to determined as being in the wireless charging mode, the path to be connected between the charging management unit and the wireless charging receiver unit, and having the wireless charging receiver unit to charge the battery of the to-be-charged device, the method further includes detecting the battery voltage and the battery current of the battery and detecting the output current of the wireless charging receiver unit.

In above solution, the controlling, responsive to determined as being in the wireless charging mode, the path to be connected between the charging management unit and the wireless charging receiver unit, and having the wireless charging receiver unit to charge the battery of the to-be-charged device includes responsive to determined as being in a wireless fast charging mode, controlling the charging management unit to switch to the wireless charging receiver unit; transmitting the control instruction to the wireless charging device on the basis of the battery voltage, the battery current and the output current of the wireless charging receiver unit that are obtained by detection; receiving, by the wireless charging receiver unit, a wireless charging signal adjusted by the wireless charging device, and having the wireless charging receiver unit to output an adjusted first DC voltage and an adjusted first DC current; performing, by the first voltage conversion subunit, a voltage conversion on the adjusted first DC voltage and the adjusted first DC current to obtain a second charging voltage and a second charging current; and loading the second charging voltage and the second charging current to the battery to charge the battery.

In above solution, the controlling, responsive to determined as being in the wired charging mode, the path to be connected between the charging management unit and the wired charging connector unit, and having the wired charging connector unit to charge the battery of the to-be-charged device includes responsive to determined as being in a wired ordinary charging mode, controlling the load switch to switch to the wired charging connector unit; performing, by the first voltage conversion subunit, a voltage conversion on a second direct-current (DC) voltage and a second DC current outputted by the wired charging connector unit to obtain a third charging voltage and a third charging current; and loading the third charging voltage and the third charging current to the battery to charge the battery.

In above solution, the method further includes responsive to determined as being concurrently in the wireless charging mode and the wired charging mode, controlling the wired charging connector unit to be in an activated state and the wireless charging receiver unit to be in a deactivated state.

In above solution, the battery includes a single-cell structure and a N-cells connected-in-series structure, where N is a positive integer greater than 1.

In a fifth aspect, the embodiments of the present disclosure provide a to-be-charged device including a storage and a processor; the storage, configured to store computer programs executable on the processor; and the processor, configured to execute, when running the computer programs, the steps of the method according to any of the solutions in the fourth aspect.

In a sixth aspect, the embodiments of the present disclosure provide a computer storage medium, storing a charging program that executes, when executed by at least one processor, the steps of the method according to any of the solutions in the fourth aspect.

Embodiments of the present disclosure provide a charging device, a to-be-charged device, a charging method, and a computer storage medium. The charging device includes a wireless charging receiver unit, a wired charging connector unit, a control unit and a charging management unit. When it is determined as being in a wireless charging mode, the control unit controls a path to be connected between the charging management unit and the wireless charging receiver unit. When it is determined as being in a wired charging mode, the control unit can further control a path to be connected between the charging management unit and the wired charging connector unit. As such, the charging device can not only realize wired charging, but also be compatible with wireless charging. Moreover, based on the path being connected by the control unit, the wireless charging receiver unit or the wired charging connector unit charges the battery by means of the charging management unit. Because the charging management unit is shared, it can also simplify the design of hardware circuit, improve utilization of PCB and save the cost. Eventually, the control unit is further configured to transmit, responsive to determined as being in the wireless charging mode, a control instruction to the wireless charging device based on a battery voltage, a battery current and an output current of the wireless charging receiver unit obtained by detection. The control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current. Therefore, it can also solve the heat problem caused during the to-be-charged device is charged under the wireless charging mode, thereby improving the charging efficiency.

DETAILED DESCRIPTION

To provide a more detailed understanding of features and technical content of embodiments of the present disclosure, the implementation of the embodiments of the present disclosure is described below in detail in conjunction with the drawings. The drawings are provided for reference only and are not intended to limit the embodiments of the present disclosure.

The to-be-charged device may be a terminal, which may include, but is not limited to, a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A terminal configured to communicate via a wireless interface may be called a "wireless communication terminal", a "wireless terminal" and/or a "mobile terminal". Examples of a mobile terminal may include, but are not limited to, a mobile terminal device such as a satellite or cellular phone, a tablet computer, a notebook computer, a palm computer, a personal digital assistant (PDA), a portable media player (PMP), a navigating device and so on, and may further include a fixed terminal device such as a digital TV, a desktop computer and so on. In addition, the to-be-charged device used in the embodiments of the present disclosure may further include a power bank. The power bank can be charged to store energy to be provided for other electronic devices. The to-be-charged device is not limited thereto in the embodiments of the present disclosure.

It can be understood that wireless charging technology is derived from wireless electricity transmission technology. Base on different principles, wireless charging is primarily classified into an inductive type (or a magnetic coupling type), a radio wave transmission type and an electromagnetic resonance type. Currently, mainstream wireless charging standards include Qi, Power Matters Alliance (PMA) and Alliance for Wireless Power (A4WP), etc. In wireless charging, the inductive type is adopted for both the Qi and PMA standards while the A4WP standard adopts the electromagnetic resonance type. In an embodiment of the present disclosure, the inductive type is adopted for wireless charging for the to-be-charged device. Energy is transferred, via a magnetic field, between a wireless charging device (such as a wireless charging base station) and the to-be-charged device. Charging a battery of the to-be-charged device is realized without a need to create a cable connection between them, thereby making the charging more convenient.

However, some users are used to wired charging while others are used to wireless charging. In order to be better compatible with different user habits, embodiments of the present disclosure provide a charging device, which is able not only to enable the to-be-charged device to realize compatibility with the wired charging and the wireless charging, but also simplify the design of hardware circuit and improve utilization of printed circuit board (PCB), thereby achieving the purpose of cost down. Each embodiment of the present disclosure will be described below in detail in conjunction with the figures.

Figure 1:
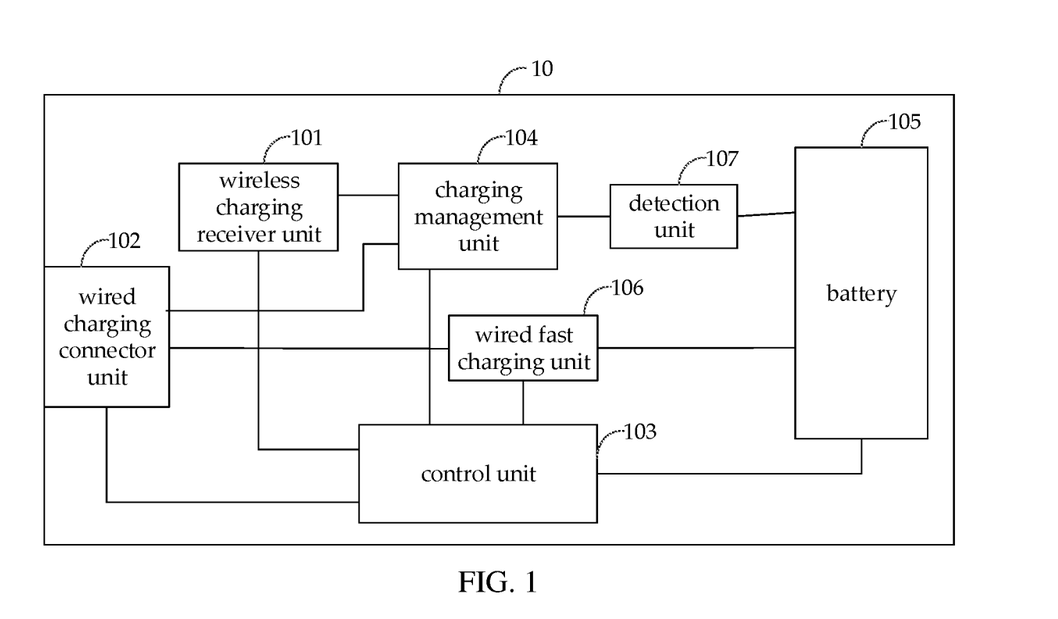
FIG. 1 is a structural schematic diagram illustrating a charging device provided in an embodiment of the present disclosure.

FIG. 1 is a structural schematic diagram illustrating a charging device provided in an embodiment of the present disclosure. As shown in FIG. 1, the charging device 10 includes a wireless charging receiver unit 101, a wired charging connector unit 102, a control unit 103, a charging management unit 104 and a battery 105. The charging management unit 104 is connected to the wireless charging receiver unit 101 and the wired charging connector unit 102. The control unit 103 is connected to the wireless charging receiver unit 101 and the wired charging connector unit 102. The control unit 103 is further connected to the charging management unit 104, and the charging management unit 104 is further connected to the battery 105.

The control unit 103 is configured to control, responsive to determined as being in a wireless charging mode, a path to be connected between the charging management unit 104 and the wireless charging receiver unit 101, and is further configured to control, responsive to determined as being in a wired charging mode, a path to be connected between the charging management unit 104 and the wired charging connector unit 102.

The charging management unit 104 is configured to have, on the basis of the path being connected by the control unit 103, the wireless charging receiver unit 101 or the wired charging connector unit 102 to charge the battery 105.

The control unit 103 is further configured to transmit, responsive to determined as being in the wireless charging mode, a control instruction to a wireless charging device on the basis of a battery voltage, a battery current and an output current of the wireless charging receiver unit 101 that are obtained by detection. The control instruction is configured to indicate that transmission power of the wireless charging device needs to be adjusted, to enable the transmission power of the wireless charging device to satisfy charging power needed by the battery 105 and enable the output current of the wireless charging receiver unit 101 to satisfy a preset range of desired current.

In the embodiment of the present disclosure, when it is determined that the charging device 10 is in the wireless charging mode, the control unit 103 can control a path to be connected between the charging management unit 104 and the wireless charging receiver unit 101. When it is determined that the charging device 10 is in the wired charging mode, the control unit 103 can control a path to be connected between the charging management unit 104 and the wired charging connector unit 102. In such a way, the charging device 10 can not only realize wired charging, but also be compatible with wireless charging, and thus has an excellent compatibility. In addition, based on the path being connected by the control unit 103, the wireless charging receiver unit 101 or the wired charging connector unit 102 charges the battery 105 by means of the charging management unit 104. Because the charging management unit 104 is shared by the two units, it can also be realized to simplify the design of hardware circuit, improve utilization of PCB and save the cost.

It needs to be noted that the wireless charging mode includes a wireless ordinary charging mode and a wireless fast charging mode, and the wired charging mode includes a wired ordinary charging mode and a wired fast charging mode. Amongst, charging power of the wireless ordinary charging mode is lower than charging power of the wireless fast charging mode, and charging power of the wired ordinary charging mode is lower than charging power of the wired fast charging mode. For example, the charging power of the wireless ordinary charging mode is 5 W, the charging power of the wireless fast charging mode is 15 W, the charging power of the wired ordinary charging mode is 10 W, and the charging power of the wired fast charging mode is 20 W. The charging power may be set for different modes based on actual needs, and embodiments of the present disclosure are not limited thereto.

In some embodiments, the charging device 10 further includes a wired fast charging unit 106 connecting to the wired charging connector unit 102 and the control unit 103.

The control unit 103 is further configured to control, responsive to determined as being in a wired fast charging mode, the wired fast charging unit 106 to be in a direct connection state.

The wired fast charging unit 106 is configured to directly load corresponding output voltage and output current of the wired charging connector unit 102 to the battery 105 to charge the battery 105.

In some embodiments, the wired fast charging unit 106 is provided with a switch subunit 1061 including at least one of a metal-oxide-semiconductor field-effect transistor (MOSFET) switch, a triode switch and a thyristor switch.

In some embodiments, the wired fast charging unit 106 can be integrated into the charging management unit 104.

It needs to be noted that the wired fast charging unit 106 is primary for realizing fast charging the to-be-charged device. Generally speaking, the wired fast charging unit 106 is provided with a switch subunit such as a MOSFET switch, a triode switch and a thyristor switch, and so on. In such a way, when it is determined that the charging device 10 is in a wired fast charging mode, the control unit 103 can transmit a first control instruction downwardly such that based on the first control instruction, the wired fast charging unit 106 is in a direct connection state. As such, corresponding output voltage and output current of the wired charging connector unit 102 can be directly loaded to the battery 105 to charge the battery 105, thereby improving efficiency of the charging.

It needs to be noted that the wired fast charging unit 106 may be merged into the charging management unit 104. When it is determined that the charging device 10 is in the wired fast charging mode, the charging device 10 may not need to conduct a charging management. In an aspect, direct charging may be adopted to directly load the corresponding output voltage and output current of the wired charging connector unit 102 to the battery 105 to charge the battery 105. In another aspect, customization may be introduced to merge the wired fast charging unit 106 into the charging management unit 104. For example, a surge-protected MOSFET switch is added to the front end of a voltage lowering subunit inside the charging management unit 104. Then, the MOSFET switch and an upper switch of a rectifying bridge device are incorporated into the wired fast charging unit 106, thereby simplifying the design of hardware circuit in a further step.

Figure 2:
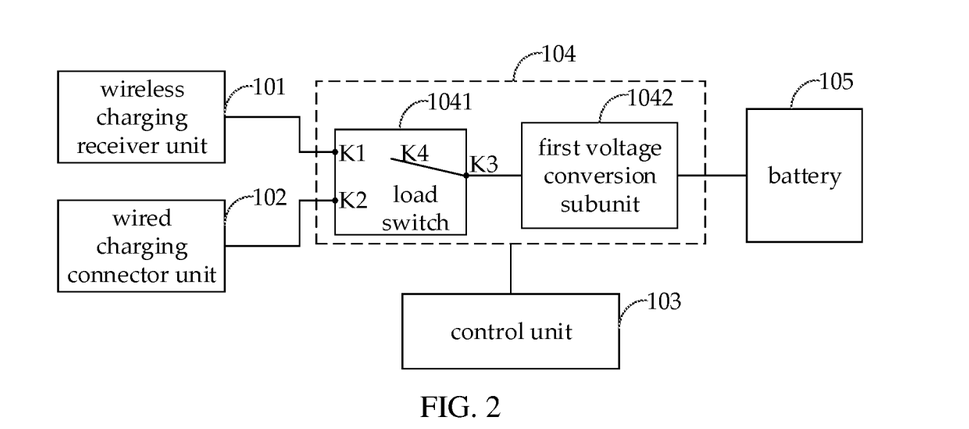
FIG. 2 is a structural schematic diagram illustrating a charging management unit provided in an embodiment of the present disclosure.

Please refer to FIG. 2 for some embodiments. FIG. 2 is a structural schematic diagram illustrating a charging management unit 104 provided in an embodiment of the present disclosure. The charging management unit 104 includes a load switch 1041 and a first voltage conversion subunit 1042.

The load switch 1041 is configured to receive the control instruction of the control module 103 and perform, on the basis of the control instruction, an operation of switching to the wireless charging receiver unit 101 or the wired charging connector unit 102.

The first voltage conversion subunit 1042 is configured to perform, on the basis of the switching operation performed by the load switch 1041, a voltage conversion on the corresponding output voltage and output current of the wireless charging receiver unit 101 or the wired charging connector unit 102.

It needs to be noted that the first voltage conversion subunit 1042 can be a boost conversion subunit, a buck conversion subunit, or a buck-boost conversion subunit, or even a charge pump conversion subunit, and the embodiments of the present disclosure are not limited thereto.

For following descriptions, the charging management unit 104 shown in FIG. 2 is taken for example. In FIG. 2, input ends (K1 and K2) of the load switch 1041 are configured to the wireless charging receiver unit 101 and the wired charging connector unit 102, respectively. An output end of the load switch 1041 is connected to the first voltage conversion subunit 1042. A selectively enabled end (K4) of the load switch 1041 is configured to execute the switching operation of the load switch. In such a way, when the load switch 1041 receives a second control instruction transmitted from the control unit 103, the selectively enabled end (K4) is switched to the wireless charging receiver unit 101. As such, corresponding output voltage and output current of the wireless charging receiver unit 101 are inputted to the first voltage conversion subunit 1042, which performs the voltage conversion on it. When the load switch 1041 receives a third control instruction transmitted from the control unit 103, the selectively enabled end (K4) is switched to the wired charging connector unit 102. As such, corresponding output voltage and output current of the wired charging connector unit 102 are inputted to the first voltage conversion subunit 1042, which performs the voltage conversion on it.

Figure 3:
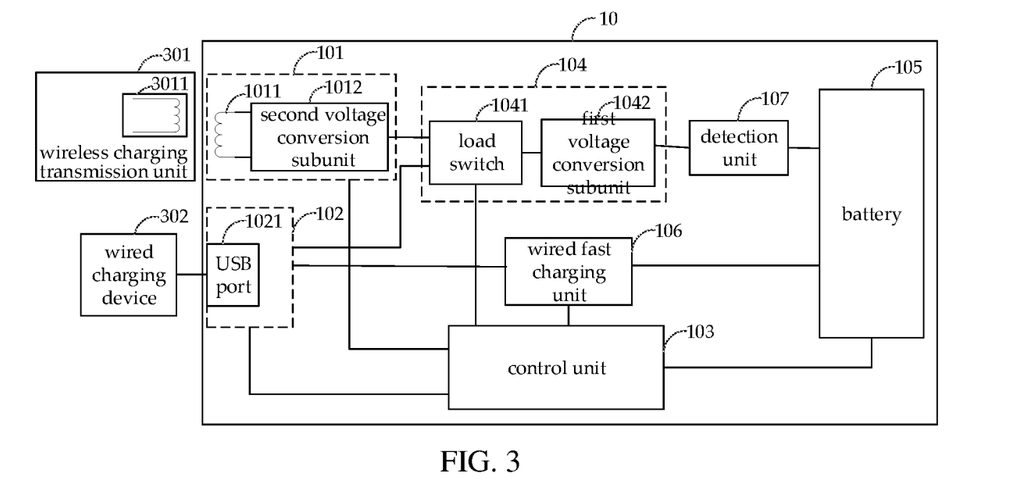
FIG. 3 is a structural schematic diagram illustrating another charging device provided in an embodiment of the present disclosure.

Please refer to FIG. 3 for some embodiments. FIG. 3 is a structural schematic diagram illustrating another charging device 10 provided in an embodiment of the present disclosure. As shown in FIG. 3, the wireless charging receiver unit 101 is wirelessly connected to an external wireless charging device 301, and the wired charging connector unit 102 is connected to an external wired charging device 302 via a charging able. The wireless charging receiver unit 101 includes a reception coil 1011 and a second voltage conversion subunit 1012. The wired charging connector unit 102 includes a universal serial bus (USB) port 1021.

The reception coil 1011 is configured to receive a wireless charging signal transmitted by a wireless charging transmission unit 3011 inside the wireless charging device 301, and transform the wireless charging signal into an electrical signal.

The second voltage conversion subunit 1012 is configured to perform a voltage conversion on the electrical signal and output a first direct-current (DC) voltage and a first DC current.

The USB port 1021 is configured to connect the wired charging device 302 and output a second DC voltage and a second DC current based on the wired charging device 302.

It needs to be noted that wireless communication is utilized between the wireless charging device 301 and the wireless charging receiver unit 101. The wireless charging transmission unit 3011 includes a transmission coil, the wireless charging receiver unit 101 includes the reception coil, and electromagnetic induction between the coils is carried out for energy propagation. After the wireless charging transmission unit 3011 in the wireless charging device 301 transforms transmission power of the wireless charging device 301 into the wireless charging signal (e.g., an electromagnetic signal), the wireless charging signal is transmitted by the transmission coil. Then, the reception coil receives the wireless charging signal and the wireless charging receiver unit 101 converts it into electricity to obtain the first DC voltage and the first DC current.

It needs to be noted that the wired charging device 302 may include an adapter, a charger, a computer USB port, and so on, and the embodiments of the present disclosure are not limited thereto. The wired charging device 302 and the wired charging connector unit 102 are connected to each other via a charging cable. As such, when the wired charging device 302 is connected to the USB port 1021 via the charging cable, handshaking and identifying operations are performed between the wired charging device 302 and the wired charging connector unit 102. Only when the handshaking and identifying operations are carried out successfully, bidirectional communication is established between the wired charging device 302 and the wired charging connector unit 102, and the wired charging device 302 provides the second DC voltage and the second DC current to the wired charging connector unit 102.

For following descriptions, the charging device 10 shown in FIG. 3 is taken for example. Assuming that the charging device 10 is in the wireless charging mode, the wireless charging receiver unit 101 would be in an activated state and the wired charging connector unit 102 would be in a deactivated state. First, the wireless charging transmission unit 3011 in the wireless charging device 301 will transform transmission power of the wireless charging device 301 into a wireless charging signal (e.g., an electromagnetic signal) and the wireless charging signal is irradiated by the transmission coil. Then the wireless charging receiver unit 101 receives the wireless charging signal via the reception coil and conducts an electricity conversion. In this regard, because what is coupled to the transmission coil is an alternative-current (AC) signal, the electrical signal received by the reception coil is correspondingly an AC signal. Meanwhile, it further needs the second voltage conversion subunit 1012 to perform AC-to-DC (AC/DC) voltage conversion. Based on the second voltage conversion subunit 1012, it can be obtained the first DC voltage and the second DC current. Conversely, assuming that the charging device 10 is in the wired charging mode, the wired charging connector unit 102 would be in an activated state and the wireless charging receiver unit 101 would be in a deactivated state. First, the wired charging device 302 is connected to the USB port 1021 via the charging cable. When the handshaking and identifying operations between the wired charging device 302 and the wired charging connector unit 102 are carried out successfully, bidirectional communication is established between the two units, and the wired charging device 302 provides the second DC voltage and the second DC current to the wired charging connector unit 102.

In some embodiments, the charging device 10 further includes a detection unit 107 including at least one of a current sensing resistor, a current transformer, a Hall sensor and a transistor.

The detection unit 107 is configured to detect the battery voltage and the battery current of the battery 105, and is further configured to detect the output current of the charging receiver unit 101.

It needs to be noted that the detection unit 107 is generally connected in series to a detection loop for measuring a current and a voltage resided in the detection loop. In an embodiment of the present disclosure, the detection unit 107 can be of a resistor type (such as a current sensing resistor), can be a magnetic device (such as a current transformer, a Rogowski coil and a Hall sensor) and can also be a transistor (such as drain-source on resistance (RDS(ON)), or of a ratio type), and the embodiments of the present disclosure are not limited thereto.

It can be understood that when it is determined that the charging device 10 is in the wireless charging mode, the wireless charging receiver unit 101 is in an activated state and the wired charging connector unit 102 is in a deactivated state. After obtaining the first DC voltage and the first DC current outputted by the wireless charging receiver unit 101, the charging device 10 can perform ordinary charging (i.e., in a wireless ordinary charging mode) or perform fast charging (i.e., in a wireless fast charging mode).

Optionally, in the case that the charging device 10 is in the wireless ordinary charging mode, the following operations are performed.

The control unit 103 is configured to control, responsive to determined as being in a wireless ordinary charging mode, the load switch 1041 to switch to the wireless charging receiver unit 101.

The first voltage conversion subunit 1042 is configured to perform a voltage conversion on a first direct-current (DC) voltage and a first DC current outputted by the wireless charging receiver unit 101 and load a first charging voltage and a first charging current obtained after the conversion, to the battery 105 to charge the battery 105.

Optionally, in the case that the charging device 10 is in the wireless fast charging mode, the following operations are performed.

The control unit 103 is configured to control, responsive to determined as being in a wireless fast charging mode, the load switch 1041 to switch to the wireless charging receiver unit 101, and transmit the control instruction to the wireless charging device on the basis of the battery voltage, the battery current and the output current of the wireless charging receiver unit 101 that are obtained by detection.

The wireless charging receiver unit 101 is further configured to receive a wireless charging signal adjusted by the wireless charging device, and output an adjusted first DC voltage and an adjusted first DC current on the basis of the adjusted wireless charging signal.

The first voltage conversion subunit 1042 is configured to perform a voltage conversion on the adjusted first DC voltage and the adjusted first DC current and load a second charging voltage and a second charging current obtained after the conversion, to the battery 105 to charge the battery 105.

It can be understood that when it is determined that the charging device 10 is in the wired charging mode, the wireless charging receiver unit 101 is in a deactivated state and the wired charging connector unit 102 is in an activated state. After obtaining the second DC voltage and the second DC current outputted by the wired charging connector unit 102, the charging device 10 can perform ordinary charging (i.e., in a wired ordinary charging mode) or perform fast charging (i.e., in a wired fast charging mode). For the wired fast charging mode, the charging device 10 can directly charge the battery 105 by means of the wired fast charging unit 106, resulting a high efficiency, and it is not repeated herein.

Optionally, in the case that the charging device 10 is in the wired ordinary charging mode, the following operations are performed.

The control unit 104 is configured to control, responsive to determined as being in a wired ordinary charging mode, the load switch 1041 to switch to the wired charging connector unit 102.

The first voltage conversion subunit 1042 is configured to perform a voltage conversion on the second DC voltage and the second DC current outputted by the wired charging connector unit 102 and load a third charging voltage and a third charging current obtained after the conversion, to the battery 105 to charge the battery 105.

In some embodiments, the control unit 103 is further configured to control, responsive to determined as being concurrently in the wireless charging mode and the wired charging mode, the wired charging connector unit 102 to be in an activated state and the wireless charging receiver unit 101 to be in a deactivated state.

It needs to be noted that if it is determined that the charging device 10 is concurrently in the wireless charging mode and the wired charging mode, the wired charging mode is preferred. That is, the wired charging connector unit 10 is kept in the activated state, and meanwhile the wireless charging receiver unit 101 is deactivated by means of a wireless deactivating instruction transmitted by the control unit 103.

In some embodiments, the battery 105 includes a single-cell structure and a N-cells connected-in-series structure, where N is a positive integer greater than 1.

It needs to be noted that the battery 105 can be not only a single-cell structure, but also a multiple-cells connected-in-series structure, or even a multiple-cells connected-in-parallel structure, and the embodiments of the present disclosure are not limited thereto. The multiple-cells connected-in-series structure is taken as an example below. If the battery 105 adopts the multiple-cells connected-in-series structure, battery voltage of the battery 105 itself can be improved. As such, when corresponding output voltage of the wireless charging receiver unit 101 or the wired charging connector unit 102 cannot satisfy the needs of battery voltage of the multiple-cells connected-in-series structure, a boost conversion can be performed using the charging management unit 104, and a charging voltage and a charging current obtained after the conversion are loaded to the battery of the multiple-cells connected-in-series structure to charge the battery.

For following descriptions, the charging device 10 shown in FIG. 3 is taken for example. It is assumed that the battery 105 is a battery of the multiple-cells connected-in-series structure, and the charging device 10 uses the wired ordinary charging mode (for example, output power provided by the wired charging device 302 is 10 W) or the wireless ordinary charging mode (for example, transmission power provided by the wireless charging transmission unit 301 is 5 W or 7.5 W). Because the provided charging voltage is lower than the battery voltage, it can use the charging management unit 104 to perform the boost conversion, and the converted charging voltage and the converted charging current are loaded to the battery 105 to charge the battery 105. In addition, when the provided charging voltage is higher than the battery voltage, it may further use the charging management unit 104 to perform other voltage conversion to stabilize or lower the voltage for charging the battery 105. That is to say, no matter the wired ordinary charging mode or the wireless ordinary charging mode, or even the wireless fast charging mode, the charging voltage and the charging current received by the battery 105 can satisfy the needs to charge a battery of the multiple-cells connected-in-series structure.

The embodiments of the present disclosure provide a charging device, which includes a wireless charging receiver unit, a wired charging connector unit, a control unit and a charging management unit. When it is determined as being in a wireless charging mode, the control unit controls a path to be connected between the charging management unit and the wireless charging receiver unit. When it is determined as being in a wired charging mode, the control unit can further control a path to be connected between the charging management unit and the wired charging connector unit. As such, the charging device can not only realize wired charging, but also be compatible with wireless charging. Moreover, based on the path being connected by the control unit, the wireless charging receiver unit or the wired charging connector unit charges the battery by means of the charging management unit. Because the charging management unit is shared by the two units, it can also simplify the design of hardware circuit, improve utilization of PCB and achieve the purpose of cost down. Eventually, the control unit is further configured to transmit, responsive to determined as being in the wireless charging mode, a control instruction to the wireless charging device based on a battery voltage, a battery current and an output current of the wireless charging receiver unit obtained by detection. The control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current. Therefore, it can also solve the heat problem caused during the to-be-charged device is charged under the wireless charging mode, thereby improving the charging efficiency.

Figure 4:
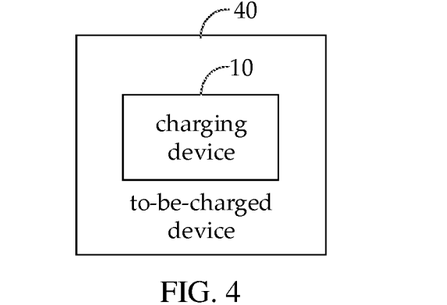
FIG. 4 is a structural schematic diagram illustrating a to-be-charged device provided in an embodiment of the present disclosure.

FIG. 4 is a structural schematic diagram illustrating a to-be-charged device provided in an embodiment of the present disclosure. As shown in FIG. 4, the to-be-charged device 40 includes the charging device 10 according to any of afore-described embodiments.

Figure 5:
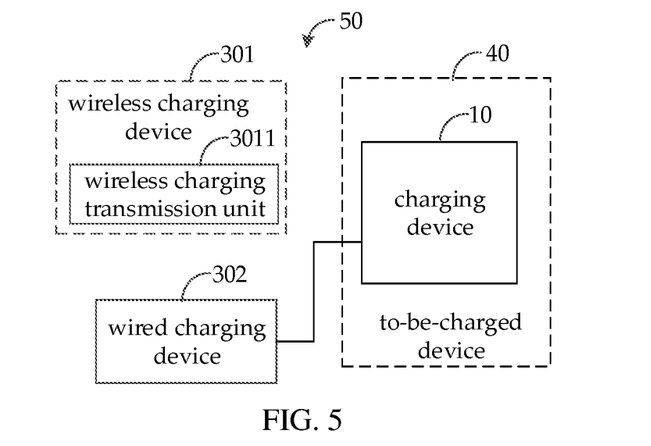
FIG. 5 is a structural schematic diagram illustrating a charging system provided in an embodiment of the present disclosure.

FIG. 5 is a structural schematic diagram illustrating a charging system provided in an embodiment of the present disclosure. As shown in FIG. 5, the charging system 50 includes a wireless charging device 301, a wired charging device 302 and the to-be-charged device 40 shown in FIG. 4. The wireless charging device 301 includes a wireless charging transmission unit 3011. The wired charging device 302 is for providing wired charging for the to-be-charged device 40. The wireless charging device 301 is for providing wireless charging for the to-be-charged device 40. In this regard, the to-be-charged device 40 is placed on a surface of the wireless charging device 301, and energy is propagated between the two devices by electromagnetic induction. to-be-charged device 40 includes the charging device 10 according to any of afore-described embodiments. In such a way, it is enabled for the to-be-charged device 40 to realize compatibility with the wireless charging and the wired charging. Moreover, by the shared charging management unit, it can also be enabled to simplify the design of hardware, improve utilization of PCB and save the cost.

Figure 6:
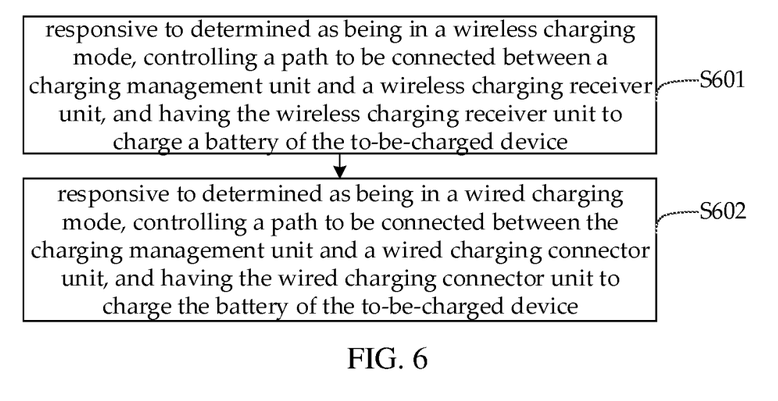
FIG. 6 is a flowchart of a charging method provided in an embodiment of the present disclosure.

Based on the concepts of afore-described embodiments, it is referred to FIG. 6, which is a flowchart of a charging method provided in an embodiment of the present disclosure. The method can be applied to the to-be-charged device 40 described in foregoing embodiments. The method may include (S601) responsive to determined as being in a wireless charging mode, controlling a path to be connected between a charging management unit and a wireless charging receiver unit, and having the wireless charging receiver unit to charge a battery of the to-be-charged device; and (S602) responsive to determined as being in a wired charging mode, controlling a path to be connected between the charging management unit and a wired charging connector unit, and having the wired charging connector unit to charge the battery of the to-be-charged device.

Responsive to determined as being in the wireless charging mode, the method may further include transmitting a control instruction to a wireless charging device on the basis of a battery voltage, a battery current and an output current of the wireless charging receiver unit that are obtained by detection, wherein the control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current.

It needs to be noted that when it is determined that the to-be-charged device is in a wireless charging mode, it may control a path to be connected between the charging management unit and the wireless charging receiver unit, and then have the wireless charging receiver unit to charge the battery of the to-be-charged device; and when it is determined that the to-be-charged device is in a wired charging mode, it may further control a path to be connected between the charging management unit and the wired charging connector unit, and then have the wired charging connector unit to charge the battery of the to-be-charged device. In such a way, not only wired charging can be realized, but also compatibility with wireless charging is carried out, and thus the to-be-charged device has an excellent compatibility. Moreover, because the charging management unit is shared by the two units, it can also be realized to simplify the design of hardware circuit, improve utilization of PCB and save the cost. Lastly, when the to-be-charged device is in the wireless charging mode, a control instruction is transmitted to the wireless charging device on the basis of a battery voltage, a battery current and an output current of the wireless charging receiver unit that are obtained by detection. The control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current. Therefore, it can also solve the heat problem caused during the to-be-charged device is charged under the wireless charging mode, thereby improving the charging efficiency.

It needs to be noted that the wireless charging mode includes a wireless ordinary charging mode and a wireless fast charging mode, and the wired charging mode includes a wired ordinary charging mode and a wired fast charging mode. Amongst, charging power of the wireless ordinary charging mode is lower than charging power of the wireless fast charging mode, and charging power of the wired ordinary charging mode is lower than charging power of the wired fast charging mode. For example, the charging power of the wireless ordinary charging mode is 5 W, the charging power of the wireless fast charging mode is 15 W, the charging power of the wired ordinary charging mode is 10 W, and the charging power of the wired fast charging mode is 20 W. The charging power may be set for different modes based on actual needs, and embodiments of the present disclosure are not limited thereto.

In some embodiments, responsive to determined as being in the wired charging mode, the method further includes responsive to determined as being in a wired fast charging mode, controlling a wired fast charging unit to be in a direct connection state; and directly loading corresponding output voltage and output current of the wired charging connector unit to the battery to charge the battery.

In some embodiments, the wired fast charging unit is provided with a switch subunit 1061 including at least one of a metal-oxide-semiconductor field-effect transistor (MOSFET) switch, a triode switch and a thyristor switch.

In some embodiments, the wired fast charging unit is integrated into the charging management unit.

It needs to be noted that the wired fast charging unit is primary for realizing fast charging the to-be-charged device. Generally speaking, the wired fast charging unit is provided with a switch subunit such as a MOSFET switch, a triode switch and a thyristor switch, and so on. In such a way, when it is determined that the charging device is in a wired fast charging mode, the control unit can transmit a first control instruction downwardly such that based on the first control instruction, the wired fast charging unit is in a direct connection state. As such, corresponding output voltage and output current of the wired charging connector unit can be directly loaded to the battery to charge the battery, thereby improving efficiency of the charging.

It needs to be noted that the wired fast charging unit may be further merged into the charging management unit. When it is determined as being in the wired fast charging mode, the charging device may not need to conduct a charging management. In an aspect, direct charging may be adopted to directly load the corresponding output voltage and output current of the wired charging connector unit to the battery to charge the battery. In another aspect, customization may be introduced to merge the wired fast charging unit into the charging management unit. For example, a surge-protected MOSFET switch is added to the front end of a voltage lowering subunit inside the charging management unit. Then, the MOSFET switch and an upper switch of a rectifying bridge device are incorporated into the wired fast charging unit, thereby simplifying the design of hardware circuit in a further step.

In some embodiments, the charging management unit includes a load switch and a first voltage conversion subunit. The load switch is configured to receive the control instruction of the control module and perform, on the basis of the control instruction, an operation of switching to the wireless charging receiver unit or the wired charging connector unit. The first voltage conversion subunit is configured to perform, on the basis of the switching operation performed by the load switch, a voltage conversion on the corresponding output voltage and output current of the wired charging connector unit or the wireless charging receiver unit.

It needs to be noted that the first voltage conversion subunit can be a boost conversion subunit, a buck conversion subunit, or a buck-boost conversion subunit, or even a charge pump conversion subunit, and the embodiments of the present disclosure are not limited thereto.

In some embodiments, the controlling, responsive to determined as being in the wireless charging mode, the path to be connected between the charging management unit and the wireless charging receiver unit, and having the wireless charging receiver unit to charge the battery of the to-be-charged device includes responsive to determined as being in a wireless ordinary charging mode, controlling the load switch to switch to the wireless charging receiver unit; performing, by the first voltage conversion subunit, a voltage conversion on a first direct-current (DC) voltage and a first DC current outputted by the wireless charging receiver unit to obtain a first charging voltage and a first charging current; and loading the first charging voltage and the first charging current to the battery to charge the battery.

In some embodiments, before the controlling, responsive to determined as being in the wireless charging mode, the path to be connected between the charging management unit and the wireless charging receiver unit, and having the wireless charging receiver unit to charge the battery of the to-be-charged device, the method further includes detecting the battery voltage and the battery current of the battery and detecting the output current of the wireless charging receiver unit.

It needs to be noted that a detection unit can be used to detect the battery voltage and the battery current. The detection unit is generally connected in series to a detection loop for measuring a current and a voltage resided in the detection loop. In an embodiment of the present disclosure, the detection unit can be of a resistor type (such as a current sensing resistor), can be a magnetic device (such as a current transformer, a Rogowski coil and a Hall sensor) and can also be a transistor (such as drain-source on resistance (RDS (ON)), or of a ratio type), and the embodiments of the present disclosure are not limited thereto.

In some embodiments, the controlling, responsive to determined as being in the wireless charging mode, the path to be connected between the charging management unit and the wireless charging receiver unit, and having the wireless charging receiver unit to charge the battery of the to-be-charged device includes responsive to determined as being in a wireless fast charging mode, controlling the charging management unit to switch to the wireless charging receiver unit; transmitting the control instruction to the wireless charging device on the basis of the battery voltage, the battery current and the output current of the wireless charging receiver unit that are obtained by detection; receiving, by the wireless charging receiver unit, a wireless charging signal adjusted by the wireless charging device, and having the wireless charging receiver unit to output an adjusted first DC voltage and an adjusted first DC current; performing, by the first voltage conversion subunit, a voltage conversion on the adjusted first DC voltage and the adjusted first DC current to obtain a second charging voltage and a second charging current; and loading the second charging voltage and the second charging current to the battery to charge the battery.

In some embodiments, the controlling, responsive to determined as being in the wired charging mode, the path to be connected between the charging management unit and the wired charging connector unit, and having the wired charging connector unit to charge the battery of the to-be-charged device includes responsive to determined as being in a wired ordinary charging mode, controlling the load switch to switch to the wired charging connector unit; performing, by the first voltage conversion subunit, a voltage conversion on a second direct-current (DC) voltage and a second DC current outputted by the wired charging connector unit to obtain a third charging voltage and a third charging current; and loading the third charging voltage and the third charging current to the battery to charge the battery.

It needs to be noted that assuming that the charging device is in the wireless charging mode, the wireless charging receiver unit would be in an activated state and the wired charging connector unit would be in a deactivated state. Based on the operating state of the wireless charging receiver unit, the charging device can perform ordinary charging (i.e., in a wireless ordinary charging mode) or perform fast charging (i.e., in a wireless fast charging mode). Assuming that the charging device is in the wired charging mode, the wireless charging receiver unit would be in a deactivated state and the wired charging connector unit would be in an activated state. Based on the operating state of the wired charging connector unit, the charging device can perform ordinary charging (i.e., in a wired ordinary charging mode) or perform fast charging (i.e., in a wired fast charging mode).

Taking the charging system 50 shown in FIG. 5, based on the charging device 10 shown in FIGS. 1 to 3 that is included in the to-be-charged device 40, the to-be-charged device 40 is in the wired charging mode when the wireless charging receiver unit 101 is in the deactivated state and the wired charging connector unit 102 is in the activated state. The wired charging device 302 is connected to the wired charging connector unit 102 via the charging cable, handshaking and identifying operations are performed between the wired charging device 302 and the wired charging connector unit 102. Bidirectional communication is performed between the wired charging device 302 and the wired charging connector unit 102 only when the handshaking and identifying operations are successfully carried out. It is assumed that the charging power provided by the wired charging device 302 is 10 W, and the to-be-charged device 40 is in the wired ordinary charging mode. The load switch 1041 is controlled by the control unit 103 to switch to the wired charging connector unit 102, and then the first voltage conversion subunit 1042 performs a voltage conversion on a second DC voltage and a second DC current outputted by the wired charging connector unit 102 and loads a third charging voltage and a third charging current obtained after the conversion, to the battery 105 to charge the battery 105. It is assumed that the charging power provided by the wired charging device 302 is 15 W, and the to-be-charged device 40 is in the wired fast charging mode. Direct charging can be used for charging the battery 105. Conversely, the to-be-charged device 40 is in the wireless charging mode when the wireless charging receiver unit 101 is in the activated state and the wired charging connector unit 102 is in the deactivated state. It is assumed that the transmission power of the wireless charging device 301 is 5 W, and the to-be-charged device 40 is in the wireless ordinary charging mode. The Qi standard may be adopted. That is, first, the load switch 1041 is controlled by the control unit 103 to switch to the wireless charging receiver unit 101. Then, the first voltage conversion subunit 1042 performs a voltage conversion on a first DC voltage and a first DC current outputted by the wireless charging receiver unit 101 and loads a first charging voltage and a first charging current obtained after the conversion, to the battery 105 to charge the battery 105. It is assumed that the transmission power of the wireless charging device 301 is 15 W, and the to-be-charged device 40 is in the wireless fast charging mode. On the basis of the Qi standard, the detection unit 107 detects a battery voltage and a battery current of the battery 105 and an output current of the wireless charging receiver unit 101. Based on bidirectional communication between the wireless charging transmission unit 3011 in the wireless charging device 301 and the wireless charging receiver unit 101 in the to-be-charged device, the control unit 103 may further transmit a control instruction to the wireless charging device 301 based on the battery voltage, the battery current and the output current of the wireless charging receiver unit. The control instruction is configured to indicate that the transmission power of the wireless charging device 301 needs to be adjusted. An adjusted wireless charging signal will be transmitted by the wireless charging transmission unit 3011. The wireless charging receiver unit 101 receives the adjusted wireless charging signal, and an adjusted first DC voltage and an adjusted first DC current are outputted by the wireless charging receiver unit 101. Then, the adjusted first DC voltage and the adjusted first DC current are performed with voltage conversion by the first voltage conversion subunit 1042. A second charging voltage and a second charging current obtained after the conversion are loaded to the battery 105 to charge the battery 105. Therefore, a voltage difference between the output end of the wireless charging receiver unit 101 and the battery is effectively controlled, heating caused during the to-be-charged device is charged is reduced, and the charging efficiency is improved.

In some embodiments, if the wireless charging receiver unit and the wired charging connector unit are concurrently in the activated state, the wired charging device is preferred for the to-be-charged device. In this regard, the method further includes responsive to determined as being concurrently in the wireless charging mode and the wired charging mode, controlling the wired charging connector unit to be in an activated state and the wireless charging receiver unit to be in a deactivated state.

It needs to be noted that if it is determined that the to-be-charged device is concurrently in the wireless charging mode and the wired charging mode, the wired charging mode is preferred. That is, the wired charging connector unit is kept in the activated state, and meanwhile the wireless charging receiver unit is deactivated by means of a wireless deactivating instruction transmitted by the control unit.

In some embodiments, the battery includes a single-cell structure and a N-cells connected-in-series structure, where N is a positive integer greater than 1.

It needs to be noted that the battery can be not only a single-cell structure, but also a multiple-cells connected-in-series structure, or even a multiple-cells connected-in-parallel structure, and the embodiments of the present disclosure are not limited thereto.

The present embodiment provides a charging method. The method is applied to the to-be-charged device. When it is determined as being in a wireless charging mode, a path is controlled to be connected between the charging management unit and the wireless charging receiver unit, and the wireless charging receiver unit is enabled to charge the battery of the to-be-charged device. When it is determined as being in a wired charging mode, a path is controlled to be connected between the charging management unit and the wired charging connector unit, and the wired charging connector unit is enabled to charge the battery of the to-be-charged device. In such a way, not only wired charging can be realized, but also compatibility with wireless charging is carried out, and thus the to-be-charged device has an excellent compatibility. Moreover, because the charging management unit is shared by the two units, it can also be realized to simplify the design of hardware circuit, improve utilization of PCB and save the cost.

Each of the functional units or modules in the solutions shown in FIGS. 1 to 3 may be integrated into one processing unit, or each unit or module may be physically present, or two or more units or modules may be integrated into one unit. The integrated unit can take the form of hardware or a software functional unit.

The integrated unit can be stored in a computer readable storage medium if realized in the form of software functional module, and not sold or used as an individual product. Based on such an understanding, the technical solutions of the present embodiments essentially, or the part contributing to the prior art, or a part of or all of the technical solutions may be implemented in a form of a software product. The computer software product is stored in a storage medium, and includes several instructions for instructing a computer device (which may be a personal computer, a server, or a network device) or a processor to perform all or a part of the steps of the approaches described in the present embodiments. The foregoing storage medium includes any medium that can store program codes, such as a USB flash drive, a removable hard disk, a Read-Only Memory (ROM), a Random Access Memory (RAM), a magnetic disk, or an optical disc.

Therefore, embodiments of the present disclosure provide a computer storage medium, which stores a charging program that executes, when executed by at least one processor, the steps of the method according to the solutions shown in FIG. 6.

Figure 7:
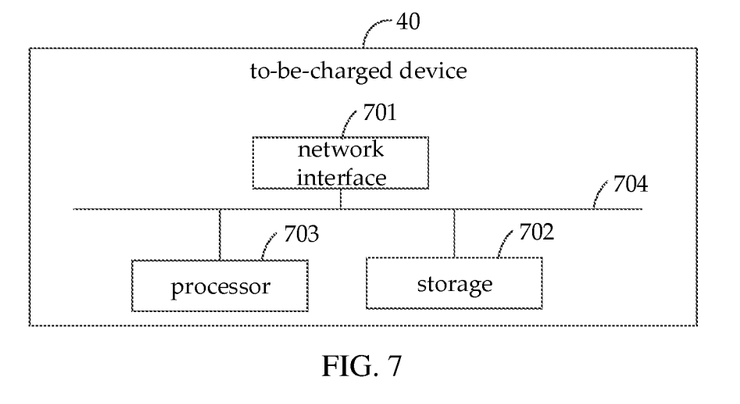
FIG. 7 is a structural schematic diagram illustrating a hardware structure of a to-be-charged device provided in an embodiment of the present disclosure.

Based on the foregoing to-be-charged device 40 and computer storage medium, it is referred to FIG. 7, which is a diagram illustrating a hardware structure of a to-be-charged device 40 provided in an embodiment of the present disclosure. The to-be-charged device 40 may include a network interface 701, a storage 702 and a processor 703. These components are coupled to each other via a bus system 704. In this regard, the bus system 704 is configured to realized connection and communication between these components. In addition to a data bus, the bus system 704 may further include a power bus, a control bus and a state signal bus. Besides, the network interface 701 is configured for signal reception and transmission in the course of information transceiving with other external network nodes.

The storage 702 is configured to store computer programs executable on the processor 703.

When executing the computer programs, the processor 703 is configured to execute responsive to determined as being in a wireless charging mode, controlling a path to be connected between a charging management unit and a wireless charging receiver unit, and having the wireless charging receiver unit to charge a battery of the to-be-charged device; and responsive to determined as being in a wired charging mode, controlling a path to be connected between the charging management unit and a wired charging connector unit, and having the wired charging connector unit to charge the battery of the to-be-charged device.

It is understood that the memory 702 in the embodiments of the present disclosure may be a volatile memory or a non-volatile memory, or may include both volatile and non-volatile memory. Suitable non-volatile memories may include read only memory (ROM), programmable ROM (PROM), erasable programmable ROM (EPROM), electrically erasable programmable ROM (EEPROM), or flash memory. Volatile memories may include random access memory (RAM), which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), sync link DRAM (SLDRAM), and direct Rambus RAM (DRRAM). The memory or storage 702 of the systems and methods described herein may include, but not limited to, these and any other suitable types of memory.

The processor 703 may be an integrated circuit chip with signal processing capabilities. In the implementation process, each act of the foregoing method may be completed by an integrated logic circuit in the processor 703 or instructions in a form of software. The processor 703 may be a general-purpose processor, a digital signal processor (DSP), an application specific integrated circuit (ASIC), a field programmable gate array (FPGA), or other programmable logic device, discrete gate, or a transistor logic device, or a discrete hardware component. The methods, steps, and logical block diagrams disclosed in the embodiments of the present disclosure can be implemented or executed. The general-purpose processor may be a microprocessor or the processor may also be any conventional processor, or the like. The steps of the method disclosed in the embodiments of the present disclosure may be directly implemented by the hardware decoding processor, or may be performed by a combination of hardware and software modules in the decoding processor. The software module may be located in a conventional storage medium in the art, such as a random access memory, a flash memory, a read only memory, a programmable read only memory or an electrically erasable programmable memory, and a register. The storage medium is located in the memory or storage 702, and the processor 703 reads the information in the memory or storage 702 and completes the acts of the above method in combination with its hardware.

It is understood that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), DSP Device (DSPD), Programmable Logic Device (PLD), Field-Programmable Gate Array (FPGA), general purpose processor, controller, microcontroller, microprocessor, other electronic unit for performing the functions described in the present disclosure, or combination thereof.

For a software implementation, the techniques described herein can be implemented by modules (e.g., procedures, and functions) that perform the functions described herein. The software code can be stored in the memory and executed by the processor. The memory can be implemented in the processor or external to the processor.

Optionally, as another embodiment, the processor 703 is further configured to perform the steps of the method in the foregoing technical solution shown in FIG. 6 when running the computer program.

It should be noted that the technical solutions described in the embodiments of the present disclosure may be arbitrarily combined without conflict.

The above is only the specific implementation of the present disclosure, but the scope of protection of the present disclosure is not limited to this. Any person skilled in the art can easily think of changes or substitutions within the scope of technology disclosed in the application, which shall be covered within the scope of protection of the present disclosure. Therefore, the scope of protection of the present disclosure shall be subjected to the scope of protection in the claims.

In the embodiments of the present disclosure, when it is determined as being in the wireless charging mode, the path is connected to be connected between the charging management unit and the wireless charging receiver unit, and the wireless charging receiver unit is enabled to charge the battery of the to-be-charged device. When it is determined as being in the wired charging mode, a path is controlled to be connected between the charging management unit and the wired charging connector unit, and the wired charging connector unit is enabled to charge the battery of the to-be-charged device. In such a way, not only wired charging can be realized, but also compatibility with wireless charging is carried out. In addition, because the charging management unit is shared, it can also simplify the design of hardware circuit, improve utilization of PCB and save the cost. Besides, when it is determined as being in the wireless charging mode, a control instruction is transmitted to the wireless charging device based on a battery voltage, a battery current and an output current of the wireless charging receiver unit obtained by detection. The control instruction is configured to indicate that transmission power of the wireless charging device needs to be adjusted, to enable the transmission power of the wireless charging device to satisfy charging power needed by the battery and enable the output current of the wireless charging receiver unit to satisfy a preset range of desired current. Therefore, it can solve the heat problem caused during the to-be-charged device is charged under the wireless charging mode, thereby improving the charging efficiency.

What is claimed is:

1. A charging device, comprising a wireless charging receiver unit, a wired charging connector unit, a control unit and a charging management unit, wherein:
    the control unit is configured to control, responsive to determining that the charging device is in a wireless charging mode, a path to be connected between the charging management unit and the wireless charging receiver unit, and further configured to control, responsive to determining that the charging device is in a wired charging mode, a path to be connected between the charging management unit and the wired charging connector unit;
    the charging management unit comprises a load switch and a first voltage conversion subunit and is configured to have, on the basis of the path being connected by the control unit, the wireless charging receiver unit or the wired charging connector unit to charge a battery;
    the control unit is further configured to transmit, responsive to determining that the charging device is in the wireless charging mode, a control instruction to a wireless charging device, wherein the control instruction is configured to indicate that transmission power of the wireless charging device needs to be adjusted, to enable the transmission power of the wireless charging device to satisfy charging power needed by the battery and enable an output current of the wireless charging receiver unit to satisfy a preset range of desired current;
    wherein the load switch is configured to receive the control instruction of the control unit and perform, on the basis of the control instruction, an operation of switching to the wireless charging receiver unit or the wired charging connector unit; and
    the first voltage conversion subunit, configured to perform, on the basis of the switching operation performed by the load switch, a voltage conversion on the corresponding output voltage and output current of the wired charging connector unit or the wireless charging receiver unit.

2. The charging device according to claim 1, further comprising a wired fast charging unit connecting to the wired charging connector unit and the control unit, wherein:
    the control unit is further configured to control, responsive to determining that the charging device is in a wired fast charging mode, the wired fast charging unit to be in a direct connection state; and
    the wired fast charging unit is configured to directly load corresponding output voltage and output current of the wired charging connector unit to the battery to charge the battery.

3. The charging device according to claim 2, wherein the wired fast charging unit is provided with a switch subunit comprising at least one of a metal-oxide-semiconductor field-effect transistor (MOSFET) switch, a triode switch and a thyristor switch.

4. The charging device according to claim 2, wherein the wired fast charging unit is integrated into the charging management unit.

5. The charging device according to claim 1, wherein the control unit is configured to control, responsive to determining that the charging device is in a wireless ordinary charging mode, the load switch to switch to the wireless charging receiver unit; and
    the first voltage conversion subunit, configured to perform a voltage conversion on a first direct-current (DC) voltage and a first DC current outputted by the wireless charging receiver unit and load a first charging voltage and a first charging current obtained after the conversion, to the battery to charge the battery.

6. The charging device according to claim 1, further comprising a detection unit comprising at least one of a current sensing resistor, a current transformer, a Hall sensor and a transistor,
    wherein the detection unit is configured to detect a battery voltage and a battery current of the battery, and further configured to detect an output current of the wireless charging receiver unit.

7. The charging device according to claim 6, wherein:
    the control unit is configured to control, responsive to determining that the charging device is in a wireless fast charging mode, the load switch to switch to the wireless charging receiver unit, and transmit the control instruction to the wireless charging device on the basis of the battery voltage, the battery current and the output current of the wireless charging receiver unit that are obtained by detection;
    the wireless charging receiver unit is further configured to receive a wireless charging signal adjusted by the wireless charging device, and output an adjusted first DC voltage and an adjusted first DC current on the basis of the adjusted wireless charging signal; and
    the first voltage conversion subunit is configured to perform a voltage conversion on the adjusted first DC voltage and the adjusted first DC current and load a second charging voltage and a second charging current obtained after the conversion, to the battery to charge the battery.

8. The charging device according to claim 1, wherein the control unit is configured to control, responsive to determining that the charging device is in a wired ordinary charging mode, the load switch to switch to the wired charging connector unit; and
    the first voltage conversion subunit is configured to perform a voltage conversion on a second direct-current (DC) voltage and a second DC current outputted by the wired charging connector unit and load a third charging voltage and a third charging current obtained after the conversion, to the battery to charge the battery.

9. The charging device according to claim 1, wherein the control unit is further configured to control, responsive to determining that the charging device is concurrently in the wireless charging mode and the wired charging mode, the wired charging connector unit to be in an activated state and the wireless charging receiver unit to be in a deactivated state.

10. A charging system, comprising a wired charging device, a wireless charging device and a charging device, wherein the charging device serves as a to-be-charged device, the wired charging device is connected to the to-be-charged device and is for charging the to-be-charged device by means of wired charging, and the wireless charging device comprises a wireless charging transmission unit for charging the to-be-charged device by means of wireless charging,
wherein the charging device comprises a wireless charging receiver unit, a wired charging connector unit, a control unit and a charging management unit, wherein:
the control unit is configured to control, responsive to determining that the charging device is in a wireless charging mode, a path to be connected between the charging management unit and the wireless charging receiver unit, and further configured to control, responsive to determining that the charging device is in a wired charging mode, a path to be connected between the charging management unit and the wired charging connector unit;
the charging management unit comprises a load switch and a first voltage conversion subunit and is configured to have, on the basis of the path being connected by the control unit, the wireless charging receiver unit or the wired charging connector unit to charge a battery; and
the control unit is further configured to transmit, responsive to determining that the charging device is in the wireless charging mode, a control instruction to a wireless charging device, wherein the control instruction is configured to indicate that transmission power of the wireless charging device needs to be adjusted, to enable the transmission power of the wireless charging device to satisfy charging power needed by the battery and enable an output current of the wireless charging receiver unit to satisfy a preset range of desired current;
wherein the load switch is configured to receive the control instruction of the control unit and perform, on the basis of the control instruction, an operation of switching to the wireless charging receiver unit or the wired charging connector unit; and
the first voltage conversion subunit, configured to perform, on the basis of the switching operation performed by the load switch, a voltage conversion on the corresponding output voltage and output current of the wired charging connector unit or the wireless charging receiver unit.

11. A charging method, comprising:
responsive to determining that a to-be-charged device is in a wireless charging mode, controlling a path to be connected between a charging management unit and a wireless charging receiver unit, and having the wireless charging receiver unit to charge a battery of the to-be-charged device; and
responsive to determining that the to-be-charged device is in a wired charging mode, controlling a path to be connected between the charging management unit and a wired charging connector unit, and having the wired charging connector unit to charge the battery of the to-be-charged device;
wherein responsive to determining that the to-be-charged device is in the wireless charging mode, the method further comprises:

transmitting a control instruction to a wireless charging device, wherein the control instruction is configured to indicate that transmission power of the wireless charging device needs to be adjusted, to enable the transmission power of the wireless charging device to satisfy charging power needed by the battery and enable an output current of the wireless charging receiver unit to satisfy a preset range of desired current;
wherein the charging management unit comprises a load switch and a first voltage conversion subunit, wherein the load switch is configured to receive the control instruction of the control unit and perform, on the basis of the control instruction, an operation of switching to the wireless charging receiver unit or the wired charging connector unit; and
the first voltage conversion subunit is configured to perform, on the basis of the switching operation performed by the load switch, a voltage conversion on the corresponding output voltage and output current of the wired charging connector unit or the wireless charging receiver unit.

12. The method according to claim 11, wherein responsive to determining that the to-be-charged device is in the wired charging mode, the method further comprises:
responsive to determining that the to-be-charged device is in a wired fast charging mode, controlling a wired fast charging unit to be in a direct connection state; and
directly loading corresponding output voltage and output current of the wired charging connector unit to the battery to charge the battery.

13. The method according to claim 12, wherein the wired fast charging unit is integrated into the charging management unit.

14. The method according to claim 11, wherein the responsive to determining that the to-be-charged device is in the wireless charging mode, controlling the path to be connected between the charging management unit and the wireless charging receiver unit, and having the wireless charging receiver unit to charge the battery of the to-be-charged device comprises:
responsive to determining that the to-be-charged device is in a wireless ordinary charging mode, controlling the load switch to switch to the wireless charging receiver unit;
performing, by the first voltage conversion subunit, a voltage conversion on a first direct-current (DC) voltage and a first DC current outputted by the wireless charging receiver unit to obtain a first charging voltage and a first charging current; and
loading the first charging voltage and the first charging current to the battery to charge the battery.

15. The method according to claim 11, wherein before the controlling, responsive to determining that the to-be-charged device is in the wireless charging mode, the path to be connected between the charging management unit and the wireless charging receiver unit, and having the wireless charging receiver unit to charge the battery of the to-be-charged device, the method further comprises:
detecting a battery voltage and a battery current of the battery and detecting the output current of the wireless charging receiver unit.

16. The method according to claim 15, wherein the controlling, responsive to determining that the to-be-charged device is in the wireless charging mode, the path to be connected between the charging management unit and the wireless charging receiver unit, and having the wireless charging receiver unit to charge the battery of the to-be-charged device comprises:

responsive to determining that the to-be-charged device is in a wireless fast charging mode, controlling the charging management unit to switch to the wireless charging receiver unit;

transmitting the control instruction to the wireless charging device on the basis of the battery voltage, the battery current and the output current of the wireless charging receiver unit that are obtained by detection;

receiving, by the wireless charging receiver unit, a wireless charging signal adjusted by the wireless charging device, and having the wireless charging receiver unit to output an adjusted first DC voltage and an adjusted first DC current;

performing, by the first voltage conversion subunit, a voltage conversion on the adjusted first DC voltage and the adjusted first DC current to obtain a second charging voltage and a second charging current; and loading the second charging voltage and the second charging current to the battery to charge the battery.

17. The method according to claim 11, wherein the controlling, responsive to determining that the to-be-charged device is in the wired charging mode, the path to be connected between the charging management unit and the wired charging connector unit, and having the wired charging connector unit to charge the battery of the to-be-charged device comprises:

responsive to determining that the charging device is in a wired ordinary charging mode, controlling the load switch to switch to the wired charging connector unit;

performing, by the first voltage conversion subunit, a voltage conversion on a second direct-current (DC) voltage and a second DC current outputted by the wired charging connector unit to obtain a third charging voltage and a third charging current; and loading the third charging voltage and the third charging current to the battery to charge the battery.

18. The method according to claim 11, further comprising:

responsive to determining that the charging device is concurrently in the wireless charging mode and the wired charging mode, controlling the wired charging connector unit to be in an activated state and the wireless charging receiver unit to be in a deactivated state.

* * * * *